H. STAFFEL.
PAN SKIP MECHANISM FOR DOUGH CUTTING MACHINES.
APPLICATION FILED JULY 2, 1910.
1,111,549.
Patented Sept. 22, 1914.
2 SHEETS—SHEET 1.
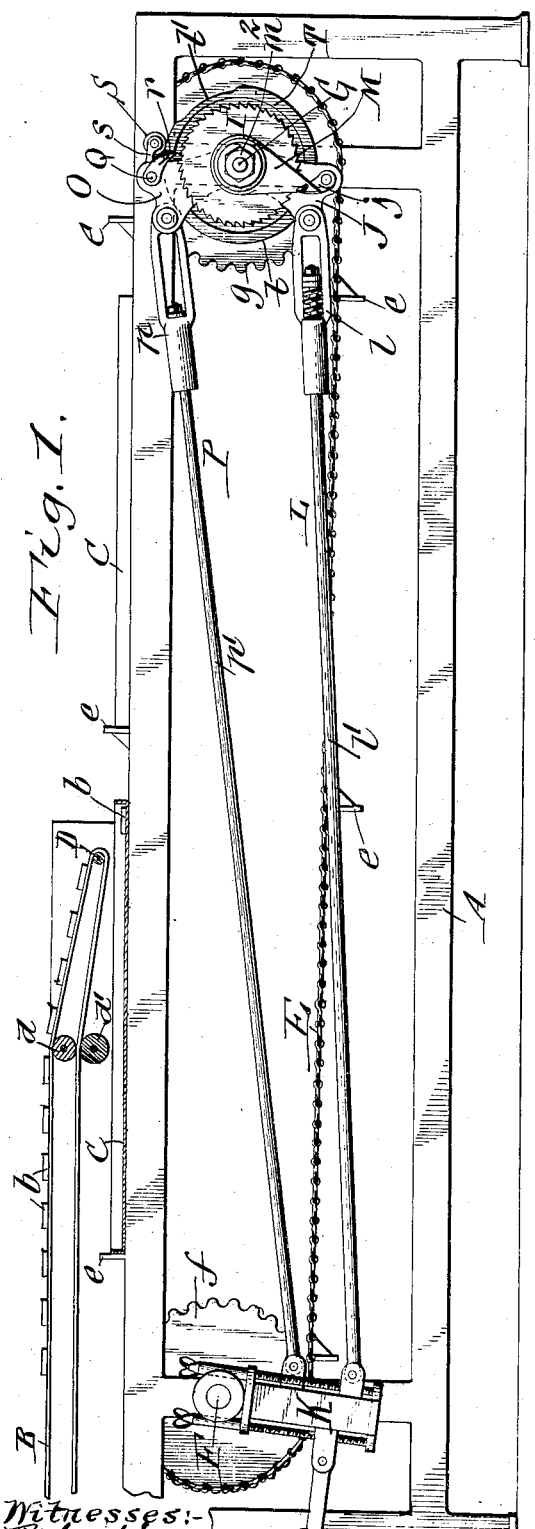
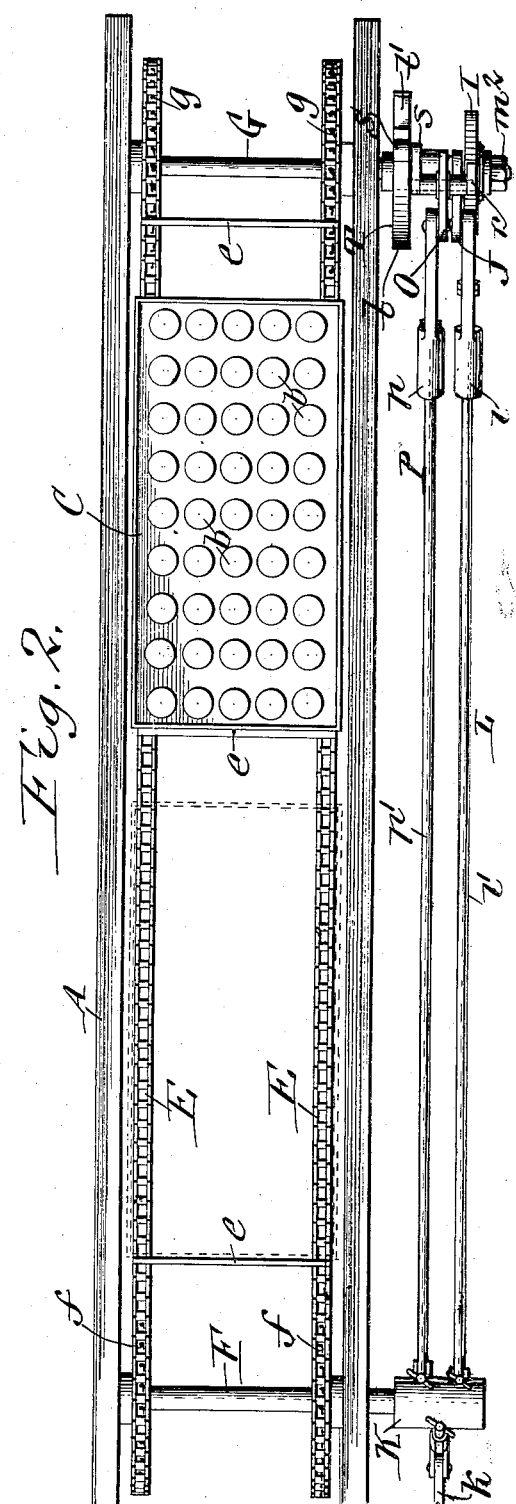

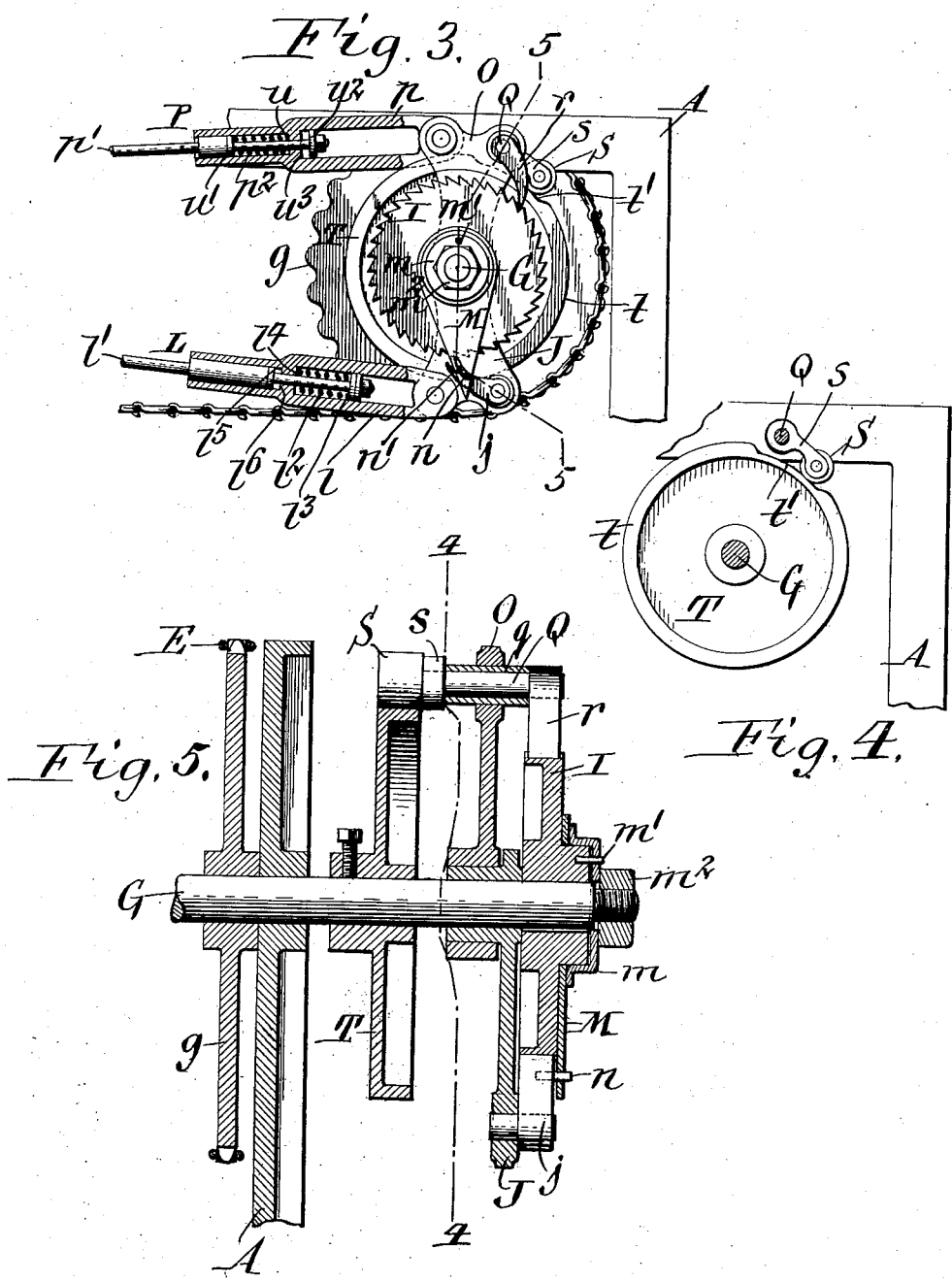

UNITED STATES PATENT OFFICE.

HENRY STAFFEL, OF BUFFALO, NEW YORK, ASSIGNOR TO THE J. W. RUGER MANUFACTURING COMPANY, OF BUFFALO, NEW YORK, A CORPORATION OF NEW YORK.

PAN-SKIP MECHANISM FOR DOUGH-CUTTING MACHINES.

1,111,549.  Specification of Letters Patent.  Patented Sept. 22, 1914.

Application filed July 2, 1910. Serial No. 570,043.

*To all whom it may concern:*

Be it known that I, HENRY STAFFEL, a citizen of the United States, residing at Buffalo, in the county of Erie and State of New York, have invented new and useful Improvements in Pan-Skip Mechanism for Dough-Cutting Machines, of which the following is a specification.

This invention relates to a pan skip mechanism for dough cutting machines. In machines of this character as ordinarily constructed the sheet of dough is divided into a plurality of cakes or blanks by an intermittently operating cutter mechanism and these cakes are then carried forwardly by means of an apron moving step by step in harmony with the operation of the cutter. At the discharge end of the cutter apron the dough cakes are discharged therefrom in transverse rows into pans which are moved forwardly by means of a pan conveyer which also normally moves forwardly step by step in the same measure as the cutter apron and in harmony with the cutter mechanism.

In order to avoid depositing cakes of dough into the spaces between the rear end of each pan and the front end of the next following pan it has been customary heretofore to employ an attendant for pushing the next following empty pan forwardly when the rear end of the preceding pan has passed the delivery end of the cutter apron and thereby avoid depositing cakes between the ends of adjacent pans.

It is the object of this invention to provide machines of this character with a mechanism whereby this skipping operation is effected automatically and which operates with certainty and without noise, and which is not liable to derange the pans when running at high speeds and thereby prevents irregular depositing of the cakes in the pans.

In the accompanying drawings consisting of 2 sheets: Figure 1 is a fragmentary side elevation of a dough cutting machine provided with my pan skip mechanism. Fig. 2 is a top plan view thereof. Fig. 3 is a fragmentary side elevation, on an enlarged scale, partly in section, of the pan skip mechanism. Fig. 4 is a fragmentary vertical longitudinal section, on a reduced scale, in line 4—4, Fig. 5. Fig. 5 is a fragmentary vertical transverse section, on an enlarged scale, in line 5—5, Fig. 3.

Similar letters of reference indicate corresponding parts throughout the several views.

A represents the main frame of the dough cutting machine which may be of any suitable construction to support the different movable parts of the machine.

B represents the cutter apron which moves horizontally lengthwise of the machine and supports the sheet of dough while the same is being cut into cakes or blanks $b$ and also moves the cakes forward and delivers the same at the tail end of the cutter apron into the pans C which are adapted to hold the cakes while the same are being baked.

In Fig. 1 only the rear part of the cutter apron is shown, this part passing at its front turn around a delivery roller D while the upper and lower runs on this apron are supported in rear of the delivery roller by means of upper and lower guide rollers $d, d'$.

The cutter apron moves forward intermittently, the mechanism whereby this is effected operating in harmony with the cutter mechanism so that the cutter apron is at rest while the cutter is descending and cutting out a row or gang of cakes from the sheet of dough which is supported by the cutter apron and when the cutter rises the cutter apron advances another step for removing the cut portion of the dough from underneath the cutter and presenting another part of the sheet of dough in position to be operated upon by the cutter during the next following downward stroke of the same. This cutter mechanism and the means for intermittently operating the same in alternation with the cutter apron may be of any suitable or approved construction and forms no part of this invention.

The pans which receive the cakes from the cutter apron are moved horizontally forward under the delivery part of the cutter apron so that the cakes of dough drop from the cutter apron into the pans as the cutter apron passes around the delivery roller D from the upper to the lower run on this apron.

The carrier or apron whereby the pans are propelled is preferably of the endless type and comprises two endless chain belts E arranged side by side so as to present an upper horizontal operative run and a lower horizontal idle run. These belts pass at their rear turns around rear supporting sprocket wheels $f$ mounted on a transverse rear shaft F journaled in suitable bearings on the adjacent part of the frame while the front or delivery turns of these belts pass around front supporting sprocket wheels $g$ secured to a delivery shaft G journaled transversely in bearings on the adjacent front part of the frame.

At suitable intervals the two belts of the pan carrier or conveyer are provided with wings or flights $e$ which are secured transversely thereto and each of which engages with the rear edge of a pan placed upon the belts and thus operates to carry the pan forward positively and also as a gage for determining the proper position of a pan on the pan carrier or apron.

The pan apron normally moves forward intermittently step by step in the same measure and simultaneously with the cutter apron. While the pan is underneath the delivery part of the cutter apron a fresh or unoccupied part of the pan is presented after each forward step to the delivery part of the cutter apron for receiving a row or batch of cakes therefrom. This regular feed mechanism for advancing the pan apron may be of any suitable construction, that shown in the drawings being similar to that heretofore in use and comprising a ratchet wheel I secured to the front transverse shaft G, a lower oscillating main feed arm J pivoted loosely on the front shaft G at the inner side of the ratchet wheel and provided at its lower end with a main feed pawl or dog $j$ which is pivoted thereto and adapted to engage at its free end with the teeth of the ratchet wheel, a depending oscillating actuating arm K which is preferably pivoted loosely on the rear transverse shaft F, a pitman L connecting the main feed arm and the actuating arm K and an actuating rod $k$ which connects the actuating arm with any suitable actuating device for oscillating the same once for every operation of the dough cutting machine.

During each forward movement of the actuating rock arm K the main feed arm moves forward idly and the main feed pawl or dog also moves idly past the teeth of the ratchet wheel. During the rearward movement of the actuating arm the main feed arm also moves rearwardly and its feed pawl is caused to engage with the teeth of the ratchet wheel whereby the latter together with the front transverse shaft, sprocket wheels, chain, wings and the pans supported thereby are caused to move forwardly. The extent of each of these movements is such that the pan is advanced a distance sufficient to accommodate a row of cakes in the pans and then held at rest while the cutter apron and cutter mechanism are at rest during the cutting operation.

In order to cause the main feed pawl to operate noiselessly while moving idly past the teeth of the ratchet wheel during the forward movement of the main feed arm, this pawl is moved positively into and out of its operative position by means of a shifting device which is of well known construction and which, as shown in the drawings, comprises a shifting arm M mounted loosely at its inner end on the hub of the ratchet wheel, a clamping cap $m$ which is connected with the hub of the ratchet wheel by means of a pin $m^1$ secured to this wheel and entering an opening in the clamping cap, a clamping screw nut $m^2$ arranged on the outer end of the front shaft G and bearing against the outer side of the cap, so that the inner part of the shifting arm is frictionally clamped between the cap and the outer side of the ratchet wheel, and a pin $n$ arranged on the free end of the main feed pawl and engaging with a cam-shaped slot $n^1$ in the outer part of the shifting arm.

During the first part of the forward movement of the main feed arm the shifting arm M remains at rest thereby causing the pin $n$ of the main feed pawl by engaging with the cam slot $n^1$ of the shifting arm to be moved outwardly, whereby the free end of the main feed pawl is disengaged from the teeth of the ratchet wheel. After this pawl has been thus disengaged from the teeth of the ratchet wheel the pin $n$ engages with the front end of the cam slot and causes the shifting arm to move forwardly with the main feed arm to the end of its forward stroke. During the first part of the subsequent rearward stroke of the main feed arm its pawl is moved into engagement with the teeth of the ratchet wheel by the pin $n$ engaging with the cam slot of the shifting arm which latter at this time is held frictionally against movement. After the main feed pawl has been thus engaged with the ratchet wheel the latter together with the shifting arm, front shaft G and other parts operatively connected therewith move together to the end of the rearward stroke of the main feed arm.

In order to avoid any jarring action of this feed mechanism a cushioning device is provided which is preferably formed by constructing the pitman L in two sections $l$, $l^1$ which telescope relative to each other, the front section $l$ having the form of a yoke and the rear section $l^1$ the form of a rod, and providing a spring $l^2$ which bears at its front end against a rearwardly facing shoulder $l^3$ on the rear section and a forwardly facing shoulder $l^4$ on the front section, as shown in Figs. 1 and 3. The expansion of the spring $l^2$ is limited by a forwardly facing shoulder $l^5$ on the rear pitman section $l^1$ bearing against a rearwardly facing shoulder $l^6$ on the front section $l$.

My improved skip mechanism operates to cause the pan apron or conveyer to move forward an extra space whenever the rear end of one pan clears the delivery end of the cutter apron, thereby causing the next following lot of cakes delivered by the cutter apron to be discharged into the front end of the next following pan instead of being spilled into the space between the adjacent ends of two pans and thus go to waste. This pan skip mechanism is constructed as follows:

O represents an oscillating upper auxiliary or skip feed arm which is preferably pivoted at its lower end on the hub of the lower or main feed arm J and operatively connected by an auxiliary or skip pitman P with the actuating rock arm K. At its upper or outer end the skip or auxiliary feed arm is provided with a bearing $q$ in which is journaled a short spindle or rock shaft Q which is arranged parallel with the front pan carrier shaft G. At the outer end of this short rock shaft or spindle is secured a skip feed pawl or dog $r$ which is adapted to be engaged with and to be disengaged from the teeth of the ratchet wheel on the upper side thereof, or in other words, on that side opposite to that on which the ratchet wheel is engaged by the main feed pawl $j$. At the inner end of the spindle Q the same is provided with a short trip arm $s$ which projects forwardly therefrom and is provided at its front end with an anti-friction roller S.

T represents a spacing wheel, disk or cam secured to the front pan carrier shaft G adjacent to the inner side of the upper and lower feed arms in line with the roller of the trip arm $s$. This cam is provided on its periphery with a high concentric face $t$ of considerable extent and a low concentric face $t^1$ which is comparatively short. During each oscillation of the actuating rock arm, the auxiliary feed arm is moved forwardly while the main feed arm is moved backwardly, and vice versa, owing to the arrangement of the auxiliary and main feed arms on opposite sides of the center of the front shaft G and the connection of the same with the actuating arm on the same side of the rear shaft F. The construction of the spacing wheel or cam is such that when a pan is underneath the delivery end of the cutter apron, the high part or face of the spacing wheel or cam engages with the roller of the trip arm and raises the skip feed pawl out of engagement from the teeth of the ratchet wheel so that at this time this pawl is moved forward and backward idly and the pan conveyer is normally moved forward intermittently by regular steps by the operation of the main feed arm and pawl and associated parts. When, however, the rear end of a pan clears the delivery end of the cutter apron, the low part or face of the spacing wheel or cam is presented to the roller of the trip arm, thereby permitting this roller to drop by gravity and the skip pawl to engage with the teeth of the ratchet wheel. The parts are so timed that this engagement of the skip pawl occurs during the last part of the rearward movement of the main and auxiliary feed arms at which time the main feed pawl has completed its active or rearward stroke and is about to begin its idle or forward stroke and the skip feed arm is about to begin its forward active stroke, thereby causing the skip pawl to be engaged with the ratchet wheel while the parts are momentarily at rest and this engagement can be effected without making any noise. As the auxiliary or skip feed arm effects its forward movement with its pawl in engagement with the teeth of the ratchet wheel, the pan conveyer operatively connected therewith is caused to move forward an additional intermediate step which practically eliminates one of the periods of rest between two regular or normal feeding steps of the pan conveyer. The extent of this additional step is such that the pan carrier skips the space between the rear end of one pan and the front end of the next following pan so that this space will not be below the delivery end of the cutter apron when the same is in motion and delivers a row of dough blanks or cakes. Immediately after effecting this extra step in the forward movement of the pan carrier the high part of the spacing cam again operates upon the roller of a trip arm to lift the skip pawl out of engagement from the teeth of the ratchet wheel and hold the same in this position until the next following space between the adjacent ends of two pans passes the delivery end of the cutter apron.

The skip mechanism is operated in the manner described once during each rotation of the spacing wheel. In order to cause this operation to occur in harmony with the other parts of the machine, the diameter of the sprocket wheels $f$, $g$, the length of the pans and other parts must necessarily be arranged and proportioned accordingly. Owing to the fact that the skip pawl is by this means engaged with the ratchet wheel at the end of its idle or the beginning of its active stroke, this pawl starts to move the ratchet wheel and associated parts slowly during the slow beginning of the forward movement of the actuating arm and as the forward movement of the latter is gradually accelerated and then slows down as it approaches the end of its forward stroke, the continued forward movement of the pan carrier is effected in the same manner, thereby preventing sudden or quick movement of the pan carrier and permitting running of the machine at a comparatively high speed without producing undue noise and without jarring the machine or disarranging the pans on the pan conveyer or the cakes in the pans. As an additional precaution against such jarring and noise, the skip pitman is constructed in two sections, $p$, $p^1$, the rear section $p^1$ having the form of a rod while the front section $p$ has the form of a yoke which has a telescopic connection with the rear section, and a spring $p^2$ is provided which bears at its opposite ends against a rearwardly facing shoulder $u$ on the front section and a forwardly facing shoulder $u^1$ on the rear section. The expansion of this spring is limited by means of a shoulder $u^2$ on the rear section adapted to bear against a forwardly facing shoulder $u^3$ on the front section, as shown in Fig. 3.

It will be noted that in this ratchet feed mechanism for the pan conveyer two pawls $j$ and $r$ are employed which operate upon the same ratchet wheel I but on diametrically opposite sides thereof. One of these pawls engages with the ratchet wheel during each forward movement thereof so as to produce the regular step by step advance of the carrier which propels the pans past the dough cutting mechanism while the other pawl is only permitted to engage with the ratchet wheel at prolonged intervals which correspond to the length of a pan and which operate at certain periods to move the ratchet wheel forward an extra step beyond an ordinary feeding step so as to move the carrier equal to the distance from the rear end of one pan to the front end of the next following pan. This engagement of the skip feed pawl with the ratchet wheel is effected by means of the cam which lowers the skip feed pawl into its operative position at the rear end of its backward stroke and at the front end of the forward stroke of the regular feed pawl. By lowering the skip feed pawl at the end of its rearward stroke at which time the rock arm carrying the skip pawl is momentarily at rest, this engagement of the skip feed pawl with the ratchet wheel is effected without making any noise and it also permits the next following forward movement of the skip feed pawl to operate upon the ratchet wheel without giving the latter a sudden jerk which otherwise would be liable to displace the pans on the conveyer. It will thus be seen that the first part of the long or skipping step is effected by the regular feed pawl and the last part of it by the skip feed pawl, these two pawls combining their effective movement to produce a skip feed action of the pan. The rock arms which support the regular feed pawl and the skip feed pawl projects in opposite directions from the axis of the ratchet wheel but they are both connected by pitmen with a rock arm K on the same side of the axis of the latter. By this means the skip feed pawl is caused to move backwardly while the regular feed pawl moves forwardly and when the skip feed pawl moves forwardly the regular feed pawl moves backwardly.

The cam T which controls the engagement and disengagement of the skip feed pawl and the ratchet wheel always turns in unison with the ratchet wheel inasmuch as the latter and the cam T are secured to the same shaft G. The rock arms O and J which pivotally support the skip feed pawl $r$ and the regular feed pawl $j$ respectively are arranged between the ratchet wheel and the cam so as to produce a compact construction and one in which the strain and wear of the parts is reduced to a minimum.

I claim as my invention:

1. A pan skip mechanism comprising a ratchet wheel, regular and skip feed rock arms turning about the same axis as said ratchet wheel and projecting from opposite sides of said axis, means for operating said rock arms so that one of said arms moves forwardly while the other moves backwardly and vice versa, a regular feed pawl mounted on said regular rock arm and engaging with said ratchet wheel during each forward movement thereof, a skip feed pawl mounted on the skip feed rock arm, and means for periodically lowering the skip feed pawl into engagement with said ratchet wheel at the end of a forward stroke of the regular rock arm and at the end of a rearward stroke of the skip feed arm and retaining the same in engagement with said ratchet wheel during the subsequent active forward movement of the skip feed arm and the idle return movement of the regular feed arm.

2. A pan skip mechanism comprising a ratchet wheel, regular and skip feed rock arms turning about the same axis as said ratchet wheel and projecting from opposite sides of said axis, means for operating said rock arms so that one of said arms moves forwardly while the other moves backwardly, and vice versa, a regular feed pawl mounted on said regular rock arm and engaging with said ratchet wheel during each forward movement thereof, a skip feed pawl mounted on the skip feed rock arm, and means for periodically lowering the skip feed pawl into engagement with said ratchet wheel at the end of a forward stroke of the regular rock arm and at the end of a rearward stroke of the skip feed arm and retaining the same in engagement with said ratchet wheel during the subsequent active forward movement of the skip feed arm and the idle return movement of the regular feed arm, comprising a trip arm connected with said skip feed pawl, and a cam turning with said ratchet wheel and engaging with said trip arm.

Witness my hand this 29th day of June, 1910.

HENRY STAFFEL.

Witnesses:
 THEO. L. POPP,
 ANNA HEIGIS.